Sept. 15, 1959 W. PERZLEY 2,904,752

PRECISE DIGITAL DELAY GENERATOR

Filed Dec. 10, 1954 7 Sheets-Sheet 1

INVENTOR.
WILLIAM PERZLEY
BY James E. Toomey
ATTY.

Sept. 15, 1959 W. PERZLEY 2,904,752
PRECISE DIGITAL DELAY GENERATOR
Filed Dec. 10, 1954 7 Sheets-Sheet 2

INVENTOR.
WILLIAM PERZLEY
BY James E. Toomey
ATTY.

Sept. 15, 1959 W. PERZLEY 2,904,752

PRECISE DIGITAL DELAY GENERATOR

Filed Dec. 10, 1954 7 Sheets-Sheet 3

INVENTOR.
WILLIAM PERZLEY
BY James E. Toomey
ATTY.

INVENTOR.
WILLIAM PERZLEY
BY James E. Toomey
ATTY.

Sept. 15, 1959 W. PERZLEY 2,904,752

PRECISE DIGITAL DELAY GENERATOR

Filed Dec. 10, 1954 7 Sheets-Sheet 5

INVENTOR.
WILLIAM PERZLEY
BY James C. Toomey
ATTY.

Sept. 15, 1959 W. PERZLEY 2,904,752

PRECISE DIGITAL DELAY GENERATOR

Filed Dec. 10, 1954 7 Sheets-Sheet 6

INVENTOR.
WILLIAM PERZLEY
BY James E. Toomey
ATTY.

INVENTOR.
WILLIAM PERZLEY
BY James E. Toomey
ATTY

United States Patent Office 2,904,752

Patented Sept. 15, 1959

2,904,752

PRECISE DIGITAL DELAY GENERATOR

William Perzley, Hi-Nella, N.J., assignor to Kaiser Metal Products, Inc., Oakland, Calif., a corporation of California Application December 10, 1954, Serial No. 474,459

21 Claims. (Cl. 324—68)

This application relates to a variable delay pulse generator, and more particularly to a precise digital delay generator which is particularly useful for accurately measuring the interval between successive signal pulses; the novel digital delay generator is also operative to generate one or more pulses, each of which is initiated a predetermined interval after the occurrence of a reference pulse.

In military and civilian applications, there are various time interval measuring systems which may be used to determine the range or distance of an object from a reference point. Particular applications may consist of radar, loran, or shoran devices in which a time interval between a reference pulse and an echo or a delayed pulse may be utilized to measure the distance between the reference point and another point whose exact position is unknown. With particular reference to radar applications, it is well known that to measure the distance between a reference point and a "target," the radar equipment must be capable of accurately measuring the time interval between the transmission of a radio-frequency pulse and the reception of an echo reflected from a target. In the usual case, the horizontal sweep of a cathode-ray tube or other reproducing device is initiated simultaneously with the transmission of a radio-frequency pulse, and the time interval between the instant of transmission and the reception of a reflected echo is measured by a constant speed or linear sweep which is utilized as a time base on the face of the cathode-ray tube. Vertically displaced pulses coincident with the instants of transmission and reception indicate the limits of the time interval. In most arrangements, the time base is calibrated directly in terms of distance since the velocity of propagation of the transmitted pulse and the received echo pulse is constant at a speed of approximately 186,000 miles per second.

There is direct correlation between the velocity of the sweep trace and the accuracy with which the time interval between the transmission of the radio-frequency pulse and the received pulse may be measured. The greater the velocity of the sweep, the more accurately can the distance be determined. However, in the usual case the range of the radar equipment is inversely related to the velocity of the sweep, and the accuracy desired imposes a limitation upon the maximum range capabilities of the radar equipment. As a specific example, when it becomes necessary to measure time delays between a reference pulse and a second pulse delayed with respect to this reference pulse by some 30 or more microseconds with an accuracy of .03 microsecond standard oscilloscopes or range indicating scopes are useless, that is, if a slow sweep is used, the accuracy of the results must suffer; and if the fast time base sweep is used to achieve the requisite accuracy, the sweep time is not long enough to cover a range of over 30 microseconds.

As a solution to this problem, the digital delay generator of the present invention utilizes a master oscillator and a pulse selecting circuit to measure accurately the number of integral microseconds of delay time between the reference pulse and the delayed pulse. The pulse selecting circuit then initiates an expanded or fast sweep trace with a pulse which is synchronized with a master clock pulse and which is delayed by an amount of time equal to this number of integral microseconds. A more accurate measurement of the fractional portion of the next microsecond is readily achieved from the expanded sweep which under these circumstances need cover a period of only one microsecond. The sum of the number of whole microseconds and the fractional portion of time read on the expanded sweep of the indicating device is a precise measurement of the time delay between the reference pulse and the delayed pulse.

This same measurement problem arises not only in the actual radar equipment which is used in the field, but also in commercially available simulators which are used for training radar operators. In this later case the actual transmission of a radio-frequency pulse is eliminated and a simulator device supplies a pulse which triggers the time base sweep and a second pulse delayed with respect to this reference pulse. In using the simulator, it is assumed that the delayed pulse corresponds to the pulse reflected from a target and the problem is to measure the distance between the reference pulse and the delayed or "echo" pulse in terms of time.

One commercially available simulator comprises a phantastron sawtooth voltage generator which generates an output signal having a linear portion of negative slope which is applied to a multiar comparator circuit. The output control voltage of a range function generator which determines the desired delay time of the pulse is also applied to the multiar comparator circuit. When the sawtooth voltage signal of the phantastron circuit equals the control voltage of the range function generator, an output pulse is generated in the multiar comparator which is delayed in time proportional to the generator voltage.

In using the simulator, a source of reference pulses which triggers the phantastron circuit to initiate the negative sawtooth wave signal is required. If in addition the device producing the trigger pulses also generates a delayed pulse which can initiate the time base sweep of the radar indicator scope only after a predetermined interval, a fast or expanded sweep may be used to determine the delay time with greater accuracy than if a slow sweep is used.

It is an object of the present invention to provide a new and novel delay generator which supplies not only a reference pulse but also a delayed pulse, each pulse being synchronized by a master oscillator pulse for use with radar equipment and simulators used therewith.

In addition to measuring the time interval between a reference pulse and an echo pulse, there is also a requirement for a device capable of accurately measuring the time interval between two successive random pulses both of which occur during the excursion of the sweep trace. The later problem arises in cases where it becomes necessary to measure the velocity (or acceleration) of a projectile or other free flight device. In such event associated controls are operated by the device to initiate a first pulse upon passing a reference point and a second pulse upon passing a second reference point which is spaced a predetermined distance from the first reference point. The measurement of the resultant time interval makes possible the determination of the speed of the device in an obvious manner.

The problems in accomplishing the accurate measurement of time intervals are not new and various attempts have been made heretofore to provide a solution thereto. In certain commercially available systems for example, a pulse is delayed with respect to a reference pulse by using a crystal controlled master oscillator to generate a reference pulse which in turn serves to initiate the time sweep on an oscilloscope. Subsequent crystal oscillator pulses trigger a series of multivibrators of the Eccles-Jordan type. A pre-set gating system, which samples the states of the various multivibrators, is used to generate the required delay pulse. The delayed pulse is generated at the instant that the multivibrators indicate the pre-set count. These systems, which constitute a step forward in the art, have the obvious shortcoming that they are subject to variations in the delay time caused by the circuit parameters of the multivibrator circuits. There would be a decided improvement in the accuracy of measurements achieved by these systems if they were arranged to utilize the more accurate output of the master oscillator directly for both the reference pulse and the delayed pulse. Furthermore although the operating range of certain prior art time delay measuring systems may be expanded by the addition of subsequent stages of counting circuits, their accuracy of measurement is impaired by the additional circuit parameters which are inherent in the counting chain structure.

It is an object of the present invention to provide a new and novel pulse delay generator in which a master oscillator is used to produce both a reference pulse and one or more pulses delayed with respect to the reference pulse through the use of gating circuits under the control of a counting chain, the counting chain being arranged to count and select the pulses of the master oscillator for use with associated equipment rather than producing the delayed trigger pulses themselves. In this manner a more accurate signal output is obtained, and the output of the system is always in synchronization with the source.

It is a further object of the present invention to provide a novel digital delay generator which may be easily expanded by the simple expedient of adding binary counting units to the single counting chain, and which provides an increased range without introducing inaccuracies because of the addition of the further circuit elements.

It is yet another object of the present invention to provide a new and novel digital delay generator in which the time interval between pulses not synchronized with the master oscillator pulse may be accurately measured.

It is an additional object of the present invention to provide a novel pulse delay generator which can be either periodic or aperiodic in its operation.

For a more complete understanding of the nature and scope of the invention, reference may be had to the following detailed description taken in connection with the accompanying drawings in which.

GENERAL DESCRIPTION

The system presented involves a fixed frequency pulse generator, means for generating a pulse in synchronism with said pulse generator, which pulse serves as a trigger for simultaneous actuation of a linear function sawtooth voltage generator unit under test, a binary counting chain, and a $t_0$ trigger pulse used as a reference pulse for an interval measurement circuit. The interval measurement circuit provides a delayed output trigger pulse $t_d$ obtained through a switching matrix selecting a particular combination of counting chain outputs and causing same to be fed through a gating arrangement to an output circuit. By such arrangement, this delayed output trigger pulse $t_d$ is delayed a precise time after $t_0$ and in incremental relation thereto, the increment of delay being determined by the repetition rate of the fixed frequency pulse standard. Such delayed output trigger pulse may then serve in the utilization circuit presented to trigger a fast oscilloscope sweep on which a vernier interpolation may be made of the remaining fractional interval between the actuation pulse at $t_0$ of the unit under test and a delayed output pulse $t_d$ from said unit, which output pulse is applied to the vertical deflection elements in accordance with usual oscilloscope practice. In the system presented, a second and further delayed output trigger pulse is selected from the counting chain by a second switching matrix and gating circuit to provide a pulse $t_s$ which acts as a stop and reset pulse for the counting chain and a trigger pulse for initiating the next counting cycle. In this manner an incrementally variable, precise repetition rate for the counting cycle is accomplished.

GENERAL ARRANGEMENT

Figures 1, 10:
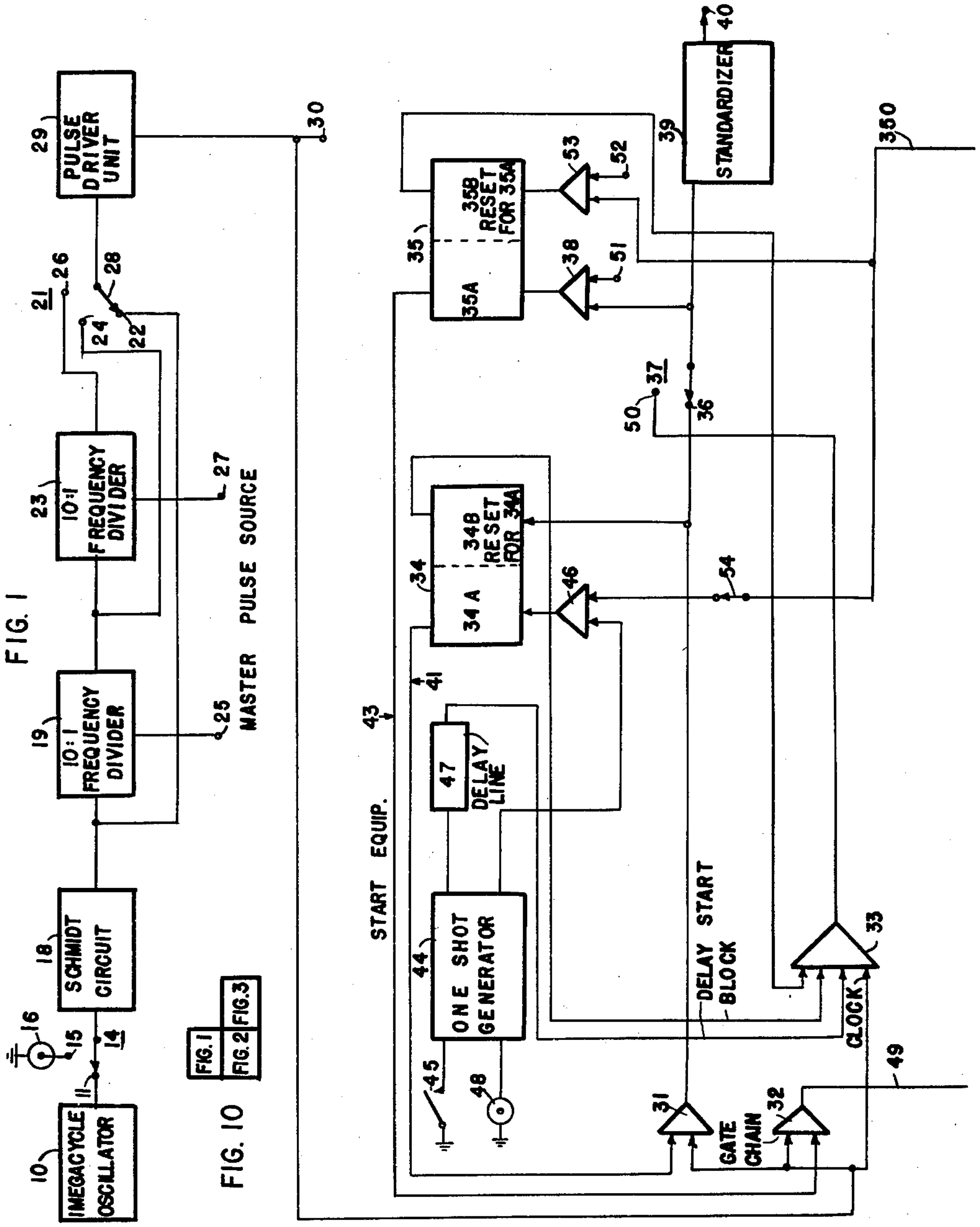
Figures 1–3 are schematic drawings, partly in block form, illustrating an embodiment of the present invention when arranged as indicated in Figure 10.
Figure 2:
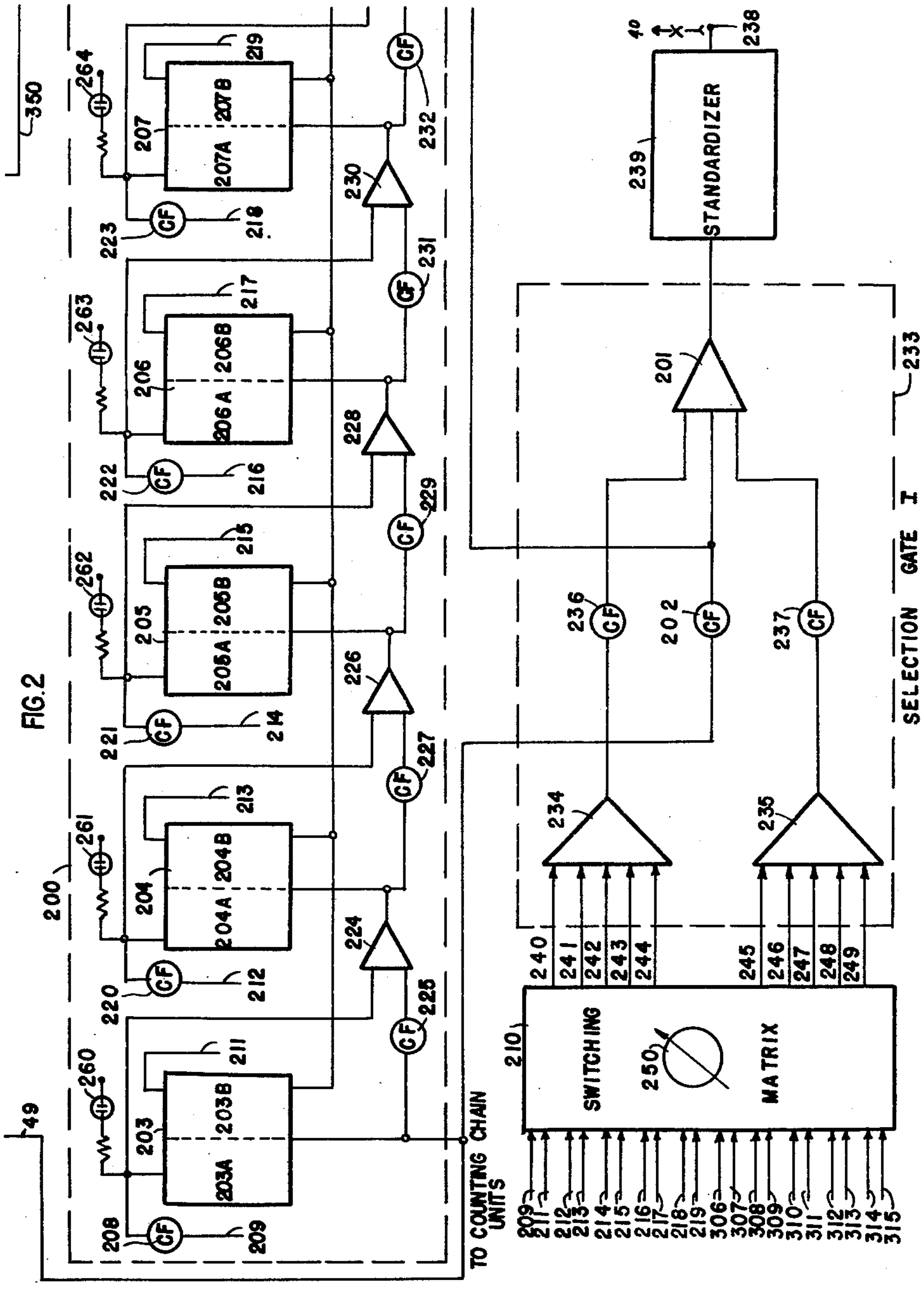
Figure 3:
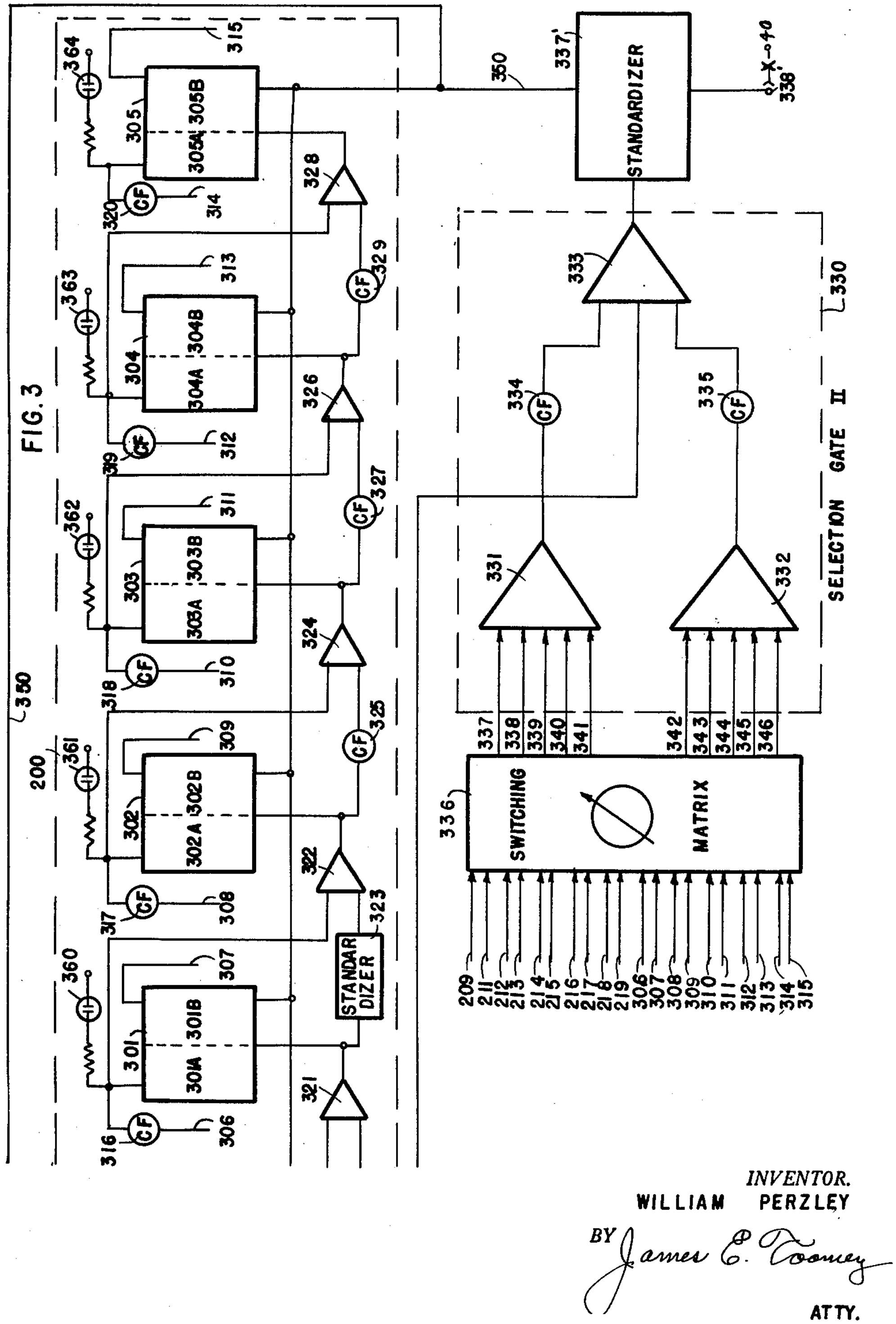

In the illustrated embodiment of Figures 1–3 a conventional sine-wave crystal controlled oscillator 10 is connected to contact 11 of a selector switch 14. In addition, an external source of pulses may be applied through jack 16 to a contact 15 of switch 14, if it is desired to expand the utility of the delay generator of the present invention in a manner to be discussed in greater detail hereinafter. For convenience of explanation, oscillator 10 may be considered to produce a sine-wave voltage signal having a frequency of one megacycle per second, although as will be apparent to those skilled in the art, other frequencies may be utilized depending upon the degree of accuracy of the measuring device desired. The output signal of oscillator 10 is applied to a pulse forming circuit 18 which may be of the Schmidt type or its equivalent which changes the sinusoidal input signal to one characterized by short duration pulses having short rise and fall times and having a repetition rate equal to the frequency of the output signal of oscillator 10. The pulse output of circuit 18 is applied to the series combination of two ten-to-one frequency dividers 19 and 23, which may be multivibrators, decade counting circuits, or energy-storage divider circuits, as convenience dictates, to reduce the repetition rate of the output pulses of Schmidt circuit 18 from 1 megacycle per second to 100 kilocycles per second and 10 kilocycles per second respectively. Marker terminals 25 and 27 are coupled to the outputs of frequency divider circuits 19 and 23 respectively for providing separate signals or markers having pulse repetition rates of either 100 or 10 kilocycles per second and as shown more fully hereafter, supply marker pulses in synchronization with any and all of the selected pulses from selection gates 233 and 330 (shown in Figures 2 and 3).

A three position switch 21 has contacts 22, 24 and 26 arranged to couple the output signals of circuits 18, 19 and 23 alternatively to the input side of a pulse driver unit 29. Three ranges of operation are thus provided which may be referred to as range I (contact 22) by which the one megacycle crystal output is directly connected to pulse driver 29; range II (contacts 24) by which the 100 kilocycle output of the first divider circuit 19 is connected to pulse driver 29; and range III (contacts 26) by which the 10 kilocycle output of second divider circuit 23 is coupled to pulse driver 29. In addition, the effective accuracy of the time interval measurements achieved by using the pulse generator herein described may be improved if the frequency of the external pulse source is made greater than that of standard source 10.

The output signal of pulse driver or amplifier 29 which is an amplified replica of its input signal is coupled to a marker terminal 30 from which amplified pulses or markers, having repetition rates alternatively of 1 megacycle per second, 100 kilocycles per second or 10 kilocycles per second, may be derived.

The output side of pulse driver 29 is also connected to gating circuits 31, 32 and 33. Control gate 33 is normally closed and is controlled in its operation by the output of multivibrator reset section 34B, one-shot generator 44 and its associated delay line 47, pulse driver 29, and gate control section 35B of multivibrator 35. Gate 33 is utilized only when switch 50 is closed, and in its operation provides a continuous flow of source pulses to output terminal 40 and its operation is set forth in further detail hereinafter.

Gates 31 and 32 are operated to pass or retard the pulses of pulse driver 29 only upon the provision of appropriate control signals from control circuits 34 and 35, in the nature of "and" type gating circuits. Control circuits 34 and 35 may be conventional multivibrators of the Eccles-Jordan type or its equivalent, the output of count chain start control section 35A being arranged to control gate 32 and the output of gate opening section 34A being arranged to control gate 31. Each of the multivibrator control circuits 34 and 35 is bistable so that either section A or section B of each multivibrator is conducting at any given time and remains in that condition until a control pulse reverses the state of the multivibrator.

Starting means for the multivibrator units 34 and 35 may comprise a one-shot generator 44 arranged to be energized alternatively by start switch 45 or by an external source of pulses applied through a jack 48. The output of generator 44 is connected to the input of multivibrator 34 to set the state of this multivibrator. As previously indicated, the output signal of gate opening section 34A of multivibrator 34 is connected to "coincidence" gate 31, and "coincidence" gate 31 is operated by master clock pulses applied to its input and the control pulse from multivibrator 34 in a manner described in greater detail hereinafter. Control gate 31 is operated to permit one pulse from the source to pass to the output circuit 40 as the reference pulse, the output pulse from gate 31 corresponding to that one of the applied pulses which is of least duration and amplitude in accordance with the nature of gate 31 which is discussed in greater detail hereinafter.

The output signal of gate 31 is applied to multivibrator reset section 34B of control multivibrator circuit 34 and to count chain start control section 35A of a second control multivibrator 35 to aid in the control of these multivibrators. The circuit for the latter stage extends over a contact 36 of a switch 37 and a diode mixer or buffer circuit 38. The output signal of gate 31 is also applied through contact 36 of switch 37 to an output circuit which may or may not include a standardizer 39. Standardizer 39 may comprise a conventional pulse shaping amplifier to permit the delay generator to be used with auxiliary equipment having a low impedance or high capacity input circuit. The output pulse of standardizer 39 may be applied to an oscilloscope or other measuring device over a terminal 40.

Gate 32 controls the passage of pulses from the source (pulse driver 29) to the counting chain; the pulse output signal of gate 32 being applied over a conductor 49 which is multipled to a cascaded binary counter 200 and to a selection gate 233. The pulse output of gate 32, as applied to selection gate 233, is extended over a portion thereof to a second selection gate 330. More specifically, the binary counter 200 in the disclosed arrangement comprises a series of multivibrator units 203–305 connected in cascade. The output signal of gate 32 is applied to the first multivibrator 203 in counting chain 200 and over a cathode follower 225 to gate 224 which comprises an "and" type coincidence circuit. Gate 32 is also connected over a cathode follower 202 of selection gate 233 to the parallel combination of "and" type gates 201 and 333 in selection gates 233 and 330 respectively.

Cascade binary counter 200 may comprise any number of multivibrator stages depending upon the desired amount of delay. For convenience, ten multivibrator stages 203–207 and 301–305 are illustrated. The output of each of multivibrators 203–207 and 301–305 is coupled to the next subsequent multivibrator in the manner well known in the art to constitute a binary counting chain which counts the pulses fed thereto over conductor 49 and in accordance with the nature of the signal agents supplied thereto over conductor 49 provides various amounts of time delay related to the repetition rate of the applied signals. The maximum delay time between the initial pulse and the $n^{th}$ or last pulse is, for example, $2^m$ times the duration of each interval, where $m$ is the number of counting stages. The time delay between successive pulses is determined by the pulse repetition rate of the control pulses applied to the input of the binary counting chain, and in the case where the master clock pulses being counted have a repetition rate of one megacycle per second, the pulses produced by the counting chain are spaced by one microsecond.

Consequently, in the present case where 10 counting stages are used and a pulse repetition rate of one megacycle per second is assumed, the maximum delay time available is $2^{10}$ times 1 microsecond or 1024 microseconds. It should be noted, however, that the binary counting chain of the present invention is used only to count master clock pulses, rather than to directly produce a trigger pulse delayed with respect to a reference pulse. In the illustrated embodiment ten multivibrator stages 203–207 and 301–305 are employed to produce delay times according to the following table:

*Table I*

| Range | Pulse Repetition Rate | Delay Time | Period Between Consecutive Pulses |
|---|---|---|---|
| I | 1 Megacycles/sec. | 1μ sec–1,000μ sec. | 1μ sec. |
| II | 100 Kilocycles/sec. | 10μ sec–10,000μ sec. | 10μ sec. |
| III | 10 Kilocycles/sec. | 100μ sec–100,000μ sec. | 100μ sec. |
| IV | (1) | (1) | (1) |

[1] Variable depending upon oscillator frequency of external signal source.

Each of these stages has two sections, as for example 203A and 203B of multivibrator 203, which are alternatively conducting and non-conducting. The output signal of section 203A is applied through a cathode follower 208 and over a conductor 209 to a switching matrix 210 which is a decimal to binary decoder. The decoder unit may be set to select a pulse which occurs at any predetermined period after a reference pulse which falls within the range of operation set forth in the above table.

With the circuit arrangement as shown, including the master oscillator and two frequency divider units, 3000 separate delay periods are available at integral delays of one period of the master oscillator. If an external pulse source is employed, the delay time of pulse $t_d$ with respect to pulse $t_0$ may be of any predetermined delay time, even up to infinity.

The output signal of section 203B is coupled to switching matrix 210 by a conductor 211. In similar fashion the output signals of sections A and B of each of multivibrators 204–207 and 301–305 are coupled to switching matrix 210 over cathode followers 220–223 and 316–320 and conductors 212–219 and 306–315 respectively.

The switching matrix 210 is a mechanical decoder for decimal to binary conversion.

Switching matrix 210 is arranged so that each of its ten output lines 240–249 may be connected alternatively to one or the other of the input conductors from a corresponding multivibrator unit in a pattern predetermined by the setting of switch 250. For example, output conductor 240 may be connected through matrix 210 to either conductor 209 or 211 which are individually connected to alternate sections of multivibrator 203. Similarly each of the other output conductors 241–249 may be connected alternatively to the respective sections of multivibrators 204–305 inclusive. The alternate sections of the multivibrators in counting chain 200 are conducting and non-conducting in accordance with the count registered. Accordingly, positive-going and negative-going control signals are applied over the individual input leads of switching matrix 210, in accordance with the registered digit, and for a given setting of switch 250 control signals of correct polarity are applied simultaneously to output conductors 240–249 only when the multivibrator sections corresponding to the predetermined digit as set on matrix 210, are conducting and non-conducting.

Gates 234 and 235 are of the coincidence or "and" type and each generates an output signal only when all of its input conductors have a signal of correct polarity applied to them simultaneously.

Gate 201 is of the coincidence or "and" type and produces an output signal only when each of its input circuits has a signal of the correct polarity simultaneously applied.

As a result, gate 201 produces an output pulse corresponding to a clock pulse applied from cathode follower 202 only upon the coincident arrival of output pulses from gates 234 and 235 each of which as previously explained produces an output pulse only when a control signal of proper polarity is applied to each input conductor. The output pulse from gate 201 is coincident with a master clock pulse and delayed by an amount of time, one master clock pulse period greater than the delay time determined by the setting of matrix 210. This output pulse $t_d$ is applied to standardizer circuit 239 wherein it is reformed to produce a pulse of more usable form. A terminal 238 is provided for utilizing this delayed pulse in an external circuit in a manner to be described hereinafter. If desired, the terminals 238 and 338' from which the delay pulses are obtained may by utilizing the "X" wiring option shown in Figures 2 and 3 be connected to terminal 40 to form a single output circuit having a single output terminal.

A second matrix 336 and selection gate 330, similar in operation to matrix 210 and selection gate 233, may be connected therewith to the conductors 209–219 and 306–315 of counting chain 200 to initiate a second output pulse a predetermined period after the termination of the reference pulse whereby it also occurs a given period after the output pulse of selection gate 233. This latter output pulse may be applied over a conductor 350 through switch 54 to section 34A of multivibrator 34 to provide recurrent reset pulses over "or" gate 46. In addition, this reset pulse is applied to all the B sections of the multivibrators of the counting chain to restore them to their original condition and to section 35B of multivibrator 35 over "or" gate 53 to prepare multivibrator 35 for the start of another count cycle. The output pulse of selection gate 330 may also be used as a second pulse delayed a predetermined interval with respect to a reference or master pulse.

As an alternative arrangement gates 234 and 235 may be replaced by a single gate of the "and" type. In this case the ten output conductors from matrix 210 are connected to the input of the single gate and a single output signal is received therefrom. In this latter arrangement, a single cathode follower may replace the two separate units 236 and 237 to provide a simpler arrangement without departing from the teachings of the invention. A similar rearrangement may be conveniently applied to the circuitry of selection gate 330.

As noted above, it may be desirable to measure the time interval between two external impulses. In that event, the first or start pulse may be connected over a terminal 51 for the purpose of starting the counting chain, and a stop pulse corresponding to the second pulse may be applied over terminal 52 to stop the operation of this chain. In this latter arrangement, indicating lamps 260–264 and 360–364 may be inserted in the output lead of one section of each of multivibrators 203–305 in the conventional manner, and the elapsed time between the applied pulses may be readily discerned from the pattern of the lighted and extinguished indicating lamps in the manner well known to those skilled in the art.

GENERAL OPERATION

A discussion of the operation of the embodiment of the delay pulse generator of Figures 1–3 may be divided into two separate portions, each of which will be individually discussed in detail. The first aspect provides for the operation of the delay pulse generator in a periodic or steady state condition in which the pulses generated in either the crystal controlled oscillator source 10, or introduced into the system from an external source 16, are counted in the binary counting chain 200, and as the count reaches the desired pulse which has been preset on the switching matrix 210, the switch matrix 210 primes gate 201 to permit the succeeding master clock pulse $t_d$ to appear at terminal 238. Switching matrix 336 is set to select a pulse $t_s$, subsequent to that selected by switching matrix 210, which is applied as a reset signal to control multivibrators 34 and 35 to recycle the operation of the delay generator and establish its periodic operation. In addition, the output pulse $t_s$ from selection gate 330 resets each of the multivibrators of the counting chain 200 to prepare it for a new count operation.

The second type of operation may be described as asynchronous or nonperiodic in which a single random pulse not coincident with a master clock pulse is utilized to initiate the operation of the delay generator, and a trigger pulse corresponding to a master clock pulse subsequent to the random pulse is generated. If desired, a further pulse delayed in time with respect to this random pulse may be produced by using selection gate 233. If additional pulses delayed in time relative to the random pulse and subsequent to the pulse produced by selection gate 233 are desired, additional switching matrices may be utilized in an obvious manner.

SYNCHRONOUS OPERATION

1. *Initiating generation of master pulses*

When it is desired to utilize synchronous or periodic operation of the delay generator of the present invention, crystal controlled oscillator 10 may be used to generate a sine-wave which in this case has a frequency of one megacycle per second. This sine-wave is applied through switch 14 to a Schmidt circuit 18, wherein it is converted into a series of pulses having a repetition rate of 1 megacycle per second and a duration of about 0.2 microsecond. The output signal of the Schmidt circuit 18 may be applied directly to pulse driver 29 through contact 22 of switch 21. The output signal of oscillator 10 may be used if a maximum delay time of 1,000 microseconds is sufficient for the desired measurements. If a greater delay time is desired, the output signals of frequency dividers 19 or 23 may be utilized. For a delay having a maximum of 10 milliseconds the output of frequency divider 19 is utilized, while if it is desired to utilize a delay of between 100 microseconds and 100 milliseconds the output of divider circuit 23 may be used. Reference to Table I will be useful in determining the range of operation desired.

2. *Equipment connections to achieve improved time measurements*

In explaining the synchronous operation of the digital delay generator of the present invention in accurately determining the delay time of a pulse, it will be assumed that an oscilloscope, having both a slow and a fast or expanded sweep, is used in conjunction with the delay generator. The simplest environment in which to show the utility of the delay generator of the present invention is its use in accurately determining the time interval between a transmitted pulse and its return echo as in a radar application. The radar indicating equipment is arranged to have its vertical deflection circuit connected to terminal 30 of pulse driver unit 29 so that a series of markers corresponding to master pulses from oscillator 10 appears upon the face of the radar scope after its sweep has been initiated. The transmitter and sweep circuits are connected to terminal 40 of standardizer 39 to receive a pulse which is applied to the transmitter and range indicator circuits of the radar equipment to simultaneously initiate a transmitted pulse and the time sweep. In this example, the delay generator is conditioned to utilize the output of crystal oscillator 10 and Schmidt circuit 18 which consists of a series of pulses spaced at 1 microsecond intervals. Pulses at a repetition rate of 1 pulse per microsecond flow from pulse driver unit 29 to terminal 30 and to gates 31, 32 and 33. However, these pulses which are continuously present in the system merely sample gates 31, 32 and 33, until the remainder of the generator is energized.

Switch 45 is now closed to initiate the operation of the delay generator. Upon closing start switch 45, a pulse from generator 44 is applied to section 34A of multivibrator 34 through diode buffer or mixer circuit 46. A gating signal from control section 34A is applied to gate 31 over conductor 41 to open gate 31 and permit a master clock pulse from pulse driver unit 29 to be applied to the input of standardizer 39 through contacts 36 of switch 37.

At the output of standardizer 39 a standardized or reshaped trigger pulse appears which may be used to trigger the radar equipment, resulting in the transmission of a pulse of radio-frequency energy, and also to initiate simultaneously the sweep of the indicator scope. The master clock pulse from gate 31 is also applied to section 35A of multivibrator 35 through diode buffer circuit 38 which is of the "or" type. A gating pulse from section 35A is applied to the input of gate 32 through a conductor 43 and opens this gate to permit pulses subsequent to the first master pulse to flow freely through gate 32 into counter circuit 200 and into gate 201 of selection gate 233 as well as to selection gate 330. The master pulse from gate 31 is applied to reset section 34B of control multivibrator 34 which returns section 34A to its original condition, whereby the gating signal for gate 31 is interrupted and gate 31 is closed. At this point a single initiating trigger pulse has been applied to the radar equipment from terminal 40 of standardizer 39 to initiate the sweep trace, and a series of marker pulses appears upon the viewing surface of the radar scope from terminal 30 of pulse driver 29.

Figure 4:
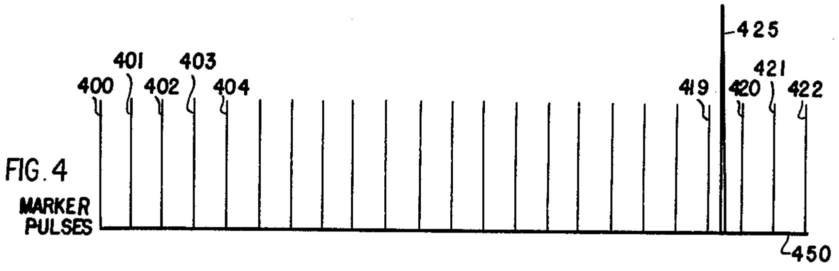
Figures 4 and 5 are graphical representations useful in explaining the operation of the embodiment of Figure 1.

Figure 4 illustrates the appearance of the marker pulses upon the viewing surface of the radar scope. In this figure the abscissa 450 represents the time base of the radar system and a plurality of pulses 400–422 separated individually by one microsecond appear vertically displaced from time base 450. Pulse 400 is the initiating or trigger pulse which gate 31 allowed to pass to initiate the transmission of the radio-frequency pulse and also the excursion of the time sweep. If, in the illustrative example, the range of the target from the radar transmitter is assumed to be such that a lapse of 19.3 microseconds occurs between the transmission of the radio-frequency pulse and the reception of the echo pulse, a pulse 425, which represents the echo or reflected pulse, appears upon the scope face after an interval of between 19 and 20 microseconds. Thus, we have a rough approximation of the time interval between the transmission of a pulse and its return echo, as shown by the time lapse between marker 400 and pulse 425.

Figure 5:
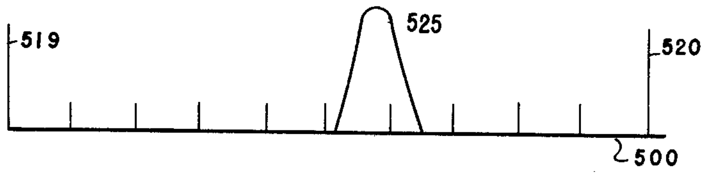

The next step comprises setting the radar scope to utilize its fast or expanded time sweep. Figure 5 shows the presentation upon the face of the radar scope utilizing this fast time sweep which in the present arrangement is shown to comprise a ratio of approximately 20 to 1 relative to the showing in Figure 4. In this case the abscissa 500 represents the time base, and the initial pulse as will be explained later, is pulse 519 corresponding to pulse 419 of the previous presentation of Figure 4, which occurs 19 microseconds after the transmitter has sent out the radio-frequency pulse in response to the initiating trigger from standardizer 39. Pulse 520, corresponding to pulse 420 of the previous figure, also appears on the scope. It is apparent therefrom that the one microsecond time interval between pulses 519 and 520 of Figure 5 has been expanded by approximately a ratio of 20 to 1 over the presentation shown in Figure 4, so that the accuracy of the measurement of the time interval will be increased by a substantial factor.

3. *Setting equipment for use of fast sweep*

In utilizing the fast sweep of the radar scope in this manner, switching matrix 210 is adjusted so that the first seventeen pulses which are counted in counting circuit 200 result in the application of control signals to input conductors 209–315 in a pattern which prevents the simultaneous application of control signals of proper polarity to input conductors 240–249 of gates 234 and 235. The eighteenth master clock pulse operates the proper combination of multivibrators of counting chain 200 and their output signals applied to matrix 210 to result in the simultaneous operation of gates 234 and 235 to prime gate 201 so as to permit passage of the nineteenth or next subsequent pulse to standardizer circuit 239. In this case the accumulator of matrix 210 is slipped back one unit (reads −1) when the input dial 250 reads "0," so that no confusion results since it is the master clock pulse prior to the desired master pulse which primes gate 201 to permit passage of the desired pulse. Standardizer 239 amplifies and reforms the pulse which is applied through terminal 238 to the radar scope to initiate the fast sweep. In this case, the expanded or fast sweep of the radar scope is initiated 19 microseconds after the initiation of the radio-frequency pulse emitted by the transmitter, and the difficulty of providing a fast sweep for a period exceeding 19 microseconds is avoided. Furthermore, master clock pulses are used to determine the delay period and initiate the expanded sweep; thus, accumulative errors due to the circuit parameters of the control circuits and counting chain are eliminated.

4. *Use in periodic operation*

In order to provide for periodic or recurrent operation of the delay generator, selection gate 330 of Figure 3 is set to a setting consistent with the operation desired. It is apparent that in any event, switching matrix 336 must be adjusted to have a greater time delay than that of switching matrix 210 if selection gate 330 is to provide a reset signal. Basically switching matrix 336 is preset so as to respond to a gating signal provided by the units in counting chain 200 which occurs after the operation of standardizer 239 as a result of the setting on switching matrix 210.

The manner in which the reset pulse may be provided by a sequentially arranged matrix such as switching matrix 336 will now be discussed. It will be recalled that after the initial operation of the delay generator, gate 32 permits the free flow of pulses from pulse driver 29, over conductor 49 and through cathode follower 202 of selection gate 233 to gate circuit 333 of selection gate 330. However, these pulses are not permitted to pass through gate 333 until control signals are simultaneously applied from gates 331 and 332 to prime it in accordance with the setting on the second switching matrix 336.

Assuming that switching matrix 336 is set so that the proper combination of control signals from the multivibrator of counting chain 200 corresponding to master clock pulse 422 of Figure 4 allows gates 331 and 332 to prime coincidence gate 333, the next following pulse from gate 32 is applied through this gate to standardizer 337′, wherein it is amplified and reshaped to form a sharply defined pulse. The output pulse of standardizer 337′ is applied over conductor 350 to all of the B sections of counting multivibrators 203–207 and 301–305 to restore these multivibrators to their original or non-operated condition. Simultaneously, an output signal from standardizer 337′ is applied over conductor 350 to section 34A of control multivibrator 34 through buffer circuit 46, in the manner of the original starting signal provided by the start equipment over conductor 350, thus initiating recycling of the digital delay generator. Additionally, the reset pulse is applied to section 35B of multivibrator 35 to reset chain start control section 35A thereof.

A section 34A of control multivibrator 34 provides a gating signal as before to reopen gate 31 to allow an initiating trigger to appear at terminal 40 of standardizer 39 to retrigger the radar equipment. At this time a second radio-frequency pulse is transmitted in response to this new trigger pulse and the return echo again appears as shown on Figure 5. By this means very accurate range measurements may be made utilizing the delay digital generator of the present invention in its periodic function.

Since the initiation of the sweep of the radar scope is determined solely by the master oscillator and the pulses generated therefrom, it is apparent that accuracy of the digital delay generator of the present invention is independent of the circuit parameters of the multivibrators used in either the control circuits or the binary counting chain. As a result the tolerance requirements of the various components of the circuits of the digital computer are greatly reduced and no special precautions need be taken in designing or assembling these circuits. Hence, a trigger pulse accurately referenced in time makes it possible to examine any time interval with the maximum expansion available on the oscilloscope being used.

If in the above desired application, the delay time of the delayed pulse is greater than the total delay time available in the counting chain even when divider 23 is utilized, arrangements have been made to use an external pulse generator 16 which may have a much lower frequency than 10 kilocycles which is the lowest frequency available using one megacycle crystal oscillator 10. It should be noted that divider circuits 19 and 23 may be also used with external pulse source to provide frequency division for pulses from that source. As a precaution, however, a frequency insensitive divider, such as a decade (digital) counter, should be employed. Hence, there is no limit to either the delay interval which can be generated or to the delay time measurable by the delay generator of the present invention.

ASYNCHRONOUS OPERATION

The delay generator of the present invention may be utilized in an asynchronous manner with an external source of periodic pulses to provide a greater delay than is possible with the counting chain without losing the precision associated with ranges I, II and III of the device. In this case one of the pulses of the external source is used to produce a reference pulse synchronized with a master clock pulse. This pulse also reconditions the delay generator for the reception of the next subsequent pulse. The next pulse also produces a second pulse synchronized with a master clock pulse through the instrumentality of the novel buffering arrangement including delay line 47 in a manner to be described hereinafter. This cyclic operation is repeated and the reference pulses so generated are synchronized with master clock pulses independently of any synchronization between the signals of the master clock pulse source and the external periodic pulse source. Consequently, the utility of the novel delay generator may be expanded without the limitations imposed by the counting chain.

In addition for certain applications it is desirable to obtain a single reference pulse plus one or two pulses delayed with respect to the reference pulse. In this case the start switch 45 is used to initiate the action of the delay generator and through the use of the buffer circuit a reference pulse synchronized with a master clock pulse is produced and subsequent delayed pulses each synchronized with a master clock pulse are generated, whereby the accuracy of the delay interval is preserved. This latter feature is extremely useful where it is desired to trigger an external utilization device in a specific sequence with precise time intervals between each trigger pulse.

Furthermore, the delay generator may be used as a delay line by recycling the generator with the delayed pulse. In this application one of the pulses from the external pulse source initiates the operation of the counting chain and after a predetermined delay period a delayed pulse $t_d$ is available at the output of selection gate 330. This delayed pulse is used to recycle the control circuits and the counting chain in preparation for the next external pulse. The cycle is repeated and provided the interval between successive external pulses is greater than the desired delay, each external pulse generates a delayed pulse in synchronism with a master clock pulse. It should be realized, however, that since the buffer circuit is used there may result a variation of plus or minus one period of master clock pulses in accuracy, as will be more fully discussed hereinafter.

1. *Connection of equipment for use in asynchronous manner*

Figure 6:
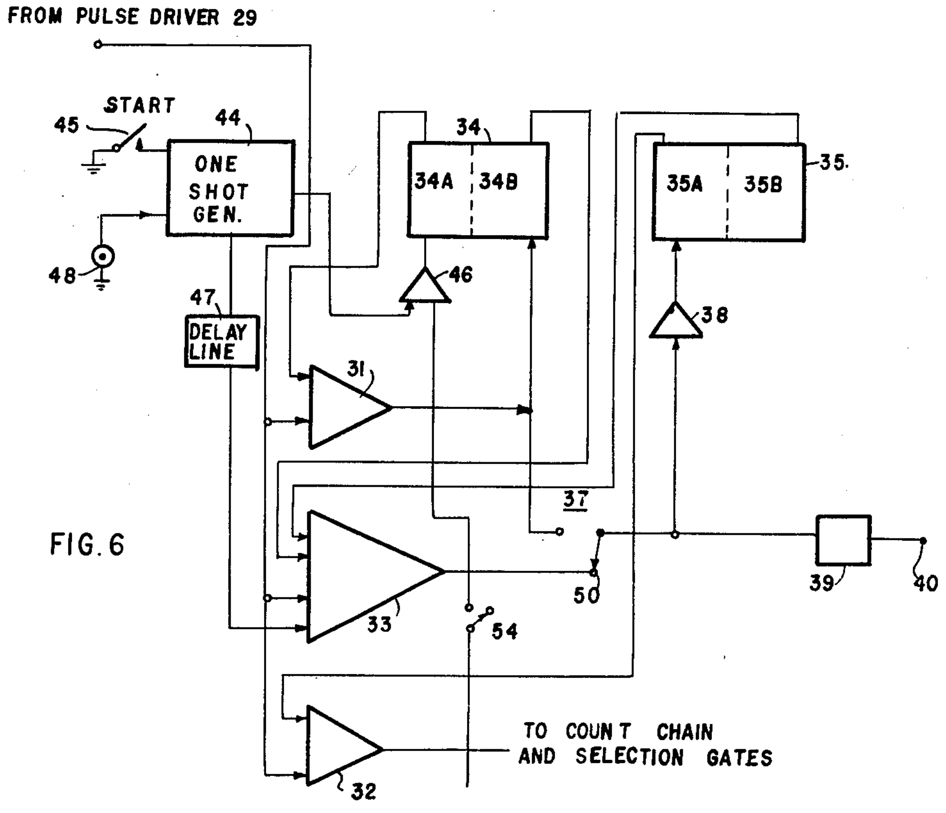
Figure 6 is a schematic diagram, partly in block form of a portion of the embodiment of Figure 1.

In explaining the operation of the delay generator under the above circumstances reference is made to Figure 6, which is identical to Figure 1, except that it has been simplified to illustrate primarily only those elements and connections used for establishing a periodic operation. Suitable connections are utilized to supply the periodic pulses from the external source over jack 48 to generator 44. Switch 54 (Figure 1 in first embodiment) is opened to prevent recycling pulses from selection gate 330 from reaching recycling section 34A of control multivibrator 34. Switch 37 is moved from contact 36 to contact 50 to interrupt the signal output of gate 31 to the standardizer 39 and in turn connect the output pulses from gate 33 to standardizer circuit 39. These pulses are also extended over buffer circuit 38 to section 35A of control multivibrator 35 to initiate the counting chain operation for producing delayed pulses in the case where sequential triggering of an external utilization device is desired.

2. *General operation—use with external source of periodic pulses*

The first external pulse received in jack 48 energizes the generator 44, resulting in a trigger pulse being applied to section 34A of control multivibrator 34 through buffer 46. This pulse triggers control multivibrator 34 which produces a control pulse to open gate 31 and permit the next succeeding master clock pulse to pass through. The first master clock pulse passing through gate 31 then operates section 34B of control multivibrator 34 to restore it to its original condition. Generator 44 also supplies a delayed control signal to coincidence gate 33 through a delay line 47, which in this case may be adjusted for a delay of about .3 microsecond in order to allow the operation of control multivibrator 34 prior to the opening of gate 33. This delay time insures that the first clock pulse succeeding the initiating external repetition pulse does not pass through gate 33.

The fact that gate 33 is unprimed during this .3 microsecond interval, plus the fact that control multivibrator 34 will then hold it closed until the next master clock pulse, will insure that the master clock pulse gated by gate 33 (whether it be the second or third pulse succeeding the random external trigger) will be full amplitude. In this case there is no possibility of marginal trigger.

The first master clock pulse after the external trigger pulse may or may not pass through gate 31 to actuate section 34B of control multivibrator 34 and reset multivibrator 34. However, the second master clock pulse will almost certainly reset multivibrator 34. If the first master clock pulse after the random trigger pulse resets control multivibrator 34, then the next succeeding master clock pulse will pass through gate 33, setting section 35A of control multivibrator 35 which in turn triggers gate 32 open to mark the start of a new count cycle, if a delayed pulse be desired.

A reference pulse corresponding to the first master clock pulse passed through gate 33 may be obtained at terminal 40 for use in an external utilization device. When a second pulse is applied to start circuit 44, gate control circuit section 34A is re-energized and opens gate 31 thereby. In the manner discussed with respect to the first random pulse, a second reference pulse from gate 33, synchronized with a master clock pulse, appears at terminal 40. Consequently, a much lower repetition rate, now determined by the repetition rate of signals from the external pulse source is achieved. This latter repetition rate may be much lower than that possible utilizing the counting chain and the generator in its periodic operation. The arrangement described functions as a buffer between the successive periodic pulses of the external source, insuring error free operation. The instantaneous repetition interval resulting can vary as much as one cycle of the master clock rate per count cycle. This is, however, a negligible amount for most functions as it represents a frequency variation of less than one part in one thousand.

3. *Detailed operation*

Figure 7A:
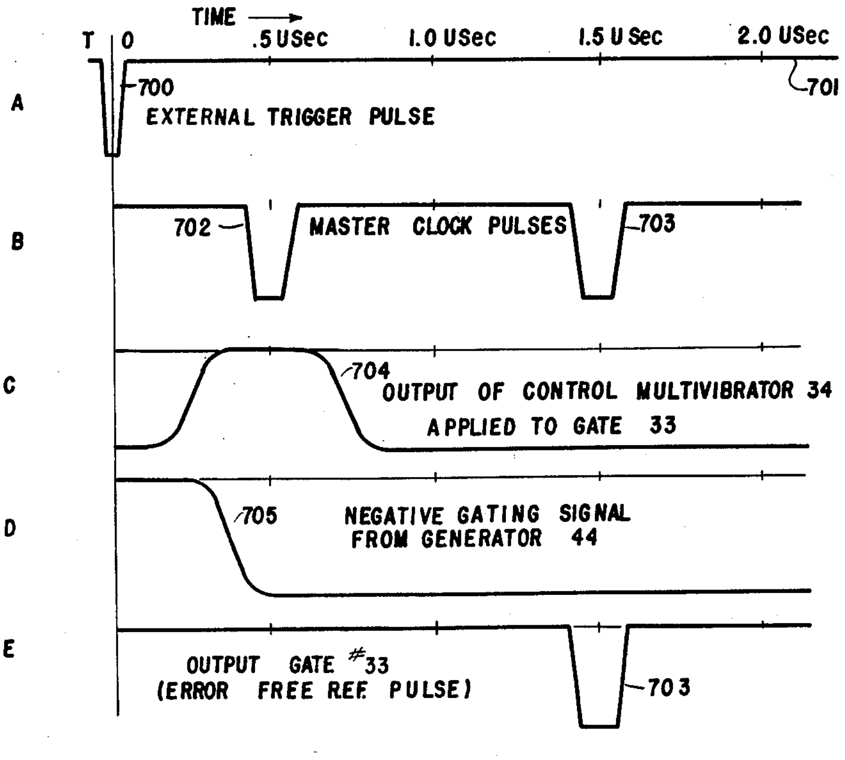
Figures 7A and 7B are graphical representations of wave forms useful in explaining the operation of the embodiment of Figure 6.

For a more stringent explanation of the delay generator in its asynchronous condition, reference will be made to Figures 7A and 7B which illustrate the time relationship between the various control signals utilized in measuring the interval between random pulses. The first trigger pulse from the external source is assumed to occur at time equal to zero, and curve A of Figure 7A shows this condition. The duration of the trigger pulse is assumed to be approximately 0.1 microsecond. Line 701 of curve A represents the time base divided into intervals of .5 microsecond.

Curve B shows master clock pulses 702 and 703 from pulse driver 29 at a repetition rate of 1 megacycle per second, and in this case the first master pulse following the external pulse is assumed to occur at a time greater than 0.3 microsecond after the random trigger pulse. As shown hereinafter such pulse will not be passed over gate 33. However, the external pulse operates section 34A of the start multivibrator 34 which opens gate 31.

Curve C illustrates the positive output pulse 704 from section 34B of control multivibrator 34 as a result of the operation of section 34A by the trigger pulse. There is a small finite time delay after the pulse from generator 44 triggers section 34A of multivibrator 34 to operate same, which delay is seen in the approximately 0.2 microsecond interval between $t=0$ and the generation of pulse 704 by section 34B. Positive pulse 704 when applied to gate 33 by section 34B prevents the passage through gate 33 of the first master clock pulse following the external trigger pulse.

Curve D of Figure 7A illustrates the negative gating signal 705 which is supplied by start circuit 44 and delay line 47 to gate 33, 0.3 microsecond after receipt of the random pulse. As is apparent from the graphs, the positive going control pulse from section 34B of multivibrator 34 offsets the negative going master clock pulse 702 and the resultant signal value will be insufficient to open gate 33.

In as much as the first clock pulse occurred more than 0.2 microsecond (the delayed operating period of multivibrator 34) after the trigger pulse, the multivibrator section 34A will have opened gate 31 and the multivibrator is reset to its original position by the master clock pulse 702 as it is applied to section 34B of multivibrator 34. Thus as the second master clock pulse 703 appears the restrictive action of multivibrator section 34B will have been removed, and the pulse 703 will be passed through gate 33 and applied to standardizer circuit 39 to appear as a trigger pulse at terminal 40.

Figure 7B:
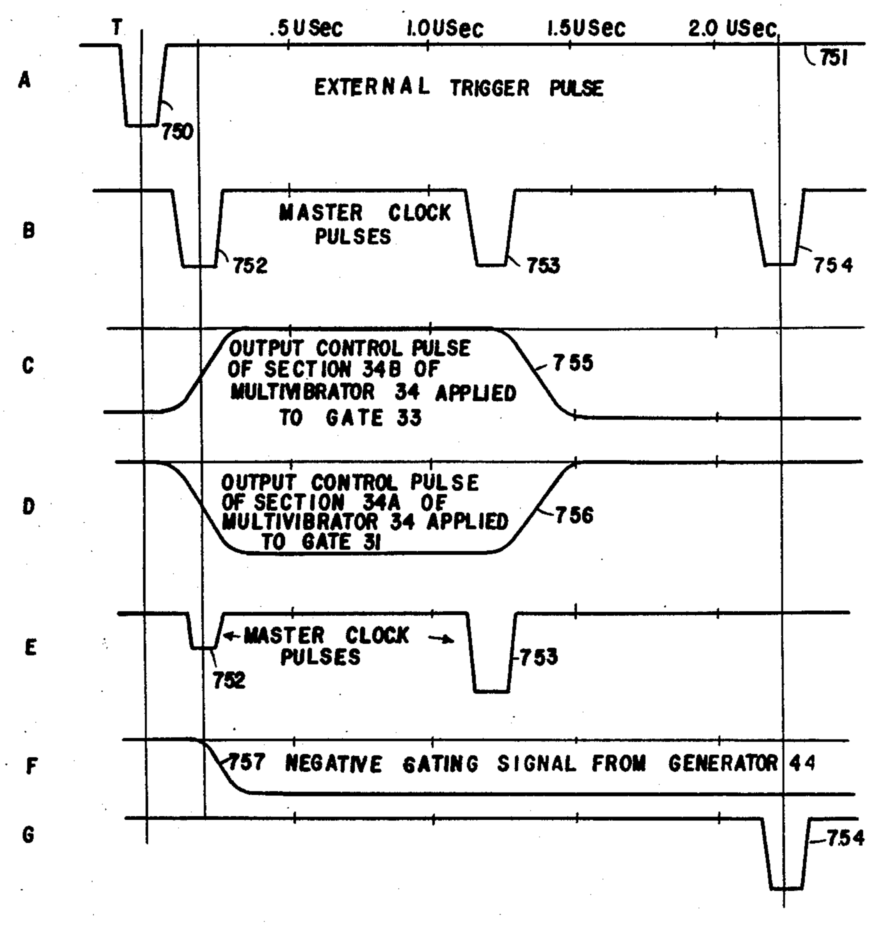

The graphical representation of Figure 7B illustrates the operation of the delay generator when the first master clock pulse following the external trigger pulse occurs at a time less than 0.3 microsecond after the random trigger pulse. Curve A of Figure 7B shows the random trigger pulse 750 occurring at $t=0$ and line 751 of curve A represents the time base line divided into periods of 0.5 microsecond. Curve B of Figure 7B shows the master clock pulses 752–754 which are each separated by an interval of 1 microsecond. The first master clock pulse 752 occurs within 0.3 microsecond after random trigger pulse 750. Trigger pulse 750 is applied to generator 44 and initiates the operation of section 34A of control multivibrator 34 to open gate 31 which permits the passage of the first and second master clock pulses 752 and 753.

As in the previous case, the operation of multivibrator 34 is delayed about 0.2 microsecond after the application of random pulse 750 as illustrated in curves C and D of Figure 7B. Multivibrator 34 operates in the well known manner in that while one section is conducting, the other section is nonconducting and in this case, the multivibrator is arranged to be stable in one operating condition until a trigger pulse reverses the state of operation. Hence, when the random trigger pulse renders section 34A conductive to produce the negative going pulse of curve D, section 34B is rendered nonconductive thereby, and its plate voltage rises to produce the positive going pulse of curce C. When multivibrator section 34A conducts, section 34B is rendered nonconductive and a positive control pulse 755 illustrated in curve C, is applied to gate 33 to prevent it from passing any of the master control pulses. Simultaneously the output pulse of section 34A of multivibrator 34, which is shown in curve D of Figure 7B as a negative pulse 756, is applied to gate 31 to open this gate and permit the flow of master pulses 752 and 753 through gate 31.

As may be seen in curve E of Figure 7B first master pulse 752 passes through gate 31 at a reduced amplitude, since the output control signal from section 34A of multivibrator 34, as applied to gate 31, has not had time to reach its full amplitude. As a result this first master clock pulse does not restore multivibrator 34 to its original condition. Upon the passage of the second master clock pulse 753 with full amplitude through gate 31 to section 34B of multivibrator 34, this section is actuated and the multivibrator resets so that the positive going gating signal 755 from section 34B no longer is applied to gate 33. A negative delayed pulse 757 shown in curve F of Figure 7B occurs 0.3 microsecond after the original external trigger pulse because of the action of delay line 47 and is applied to gate 33, but cannot open this gate because of the positive going pulse 755 from section B of multivibrator 34 which is simultaneously applied to gate 33. In the absence of gating signal 755 from section 34B, negative gating signal 757 from delay line 47 opens gate 33, and the following, or third master clock pulse 754, passes through gate 33 and to section 35A of multivibrator 35 through the series combination of switch 37 and buffer circuit 38. Concurrently, the third master clock pulse is applied to standardizer circuit 39 through switch 37 and appears as a reshaped trigger pulse at terminal 40. At the same time master clock pulse 754 operates section 35A of multivibrator 35 to open gate 32 and permit subsequent master clock pulses to flow to the counting chain, for use when a single one or a group of delayed pulses is desired.

From the above explanation of the operation of the digital delay generator of the present invention, it is apparent that any error involved between the timing of successive output trigger pulses can never be greater than one cycle of the master clock rate per count cycle. For example, if each of the two external trigger pulses which individually initiate generator 44 occurs at a time greater than 0.3 microsecond prior to the next succeeding master clock pulse, it may be seen from Figure 7A that for each external pulse, the third succeeding master clock pulse is utilized to initiate standardizer circuit 39 to produce a trigger pulse appearing at terminal 40. If on the other hand both external pulses occur at a time greater than 0.3 microsecond prior to the next master clock pulse, it is the second master clock pulse following the external pulse which produces the trigger pulse at terminal 40. In each of these cases there will be no error in the interval between the two successive external pulses. On the other hand if one of the external pulses occurs at a time less than 0.3 microsecond prior to the next master clock pulse, and the next successive external pulse occurs at a time greater than 0.3 microsecond before the next master clock pulse, there will result an error of one cycle of the master clock per count cycle. This error for most applications is neligible since it would represent a frequency variation of less than one part in one thousand when using the one megacycle oscillator to produce the master clock pulses.

4. *Provision of delayed pulse with respect to a random pulse*

Additionally, switching matrix 210 may be used in the manner previously described to produce a trigger pulse delayed by a predetermined interval with respect to a random pulse not coincident with a master clock pulse. The random pulse may be applied to start generator 44 either through jack 48 or switch 45. Additional switching matrices corresponding to switching matrix 210 may be connected in parallel with this switching matrix to produce additional pulses delayed in time with respect to a random start pulse. The device therefore exhibits great flexibility since any number of pulses delayed in time may be produced by the simple expedient of adding additional switching matrices and the delay pulses are accurately delayed with respect to the start pulse within a maximum error of one master clock pulse period.

DIODE GATE AND BUFFER CIRCUITS

A more detailed explanation of the operation of the gating and buffer circuits of the novel digital delay generator of the present invention may assist in a more complete understanding of its operation. In general there are two types of circuits utilized to pass or retard the master clock pulses at various points throughout the delay generator; these are gating circuits and buffer circuits. A gating circuit, which may be exemplified by any one of gates 31, 32 and 33 is of the coincidence or "And" circuit type and may be defined as a circuit "having an output and a multiplicity of inputs so designed that the output is energized when and only when a definite set of input conditions are met." For example, in the case of gate 31 only when a gating pulse from multivibrator 34 is applied coincidentally with a master clock pulse from pulse driver unit 29 is gate 31 opened to permit the passage of this master clock pulse. A buffer circuit may be defined as "a circuit having an output and a multiplicity of inputs whose output is energized whenever one or more inputs are energized." The buffer circuit functions as the equivalent of the logical "Or." A specific example of a buffer circuit is circuit 46 which passes a pulse from either generator 44 or from selection gate 330 to set multivibrator 34.

Figure 8:
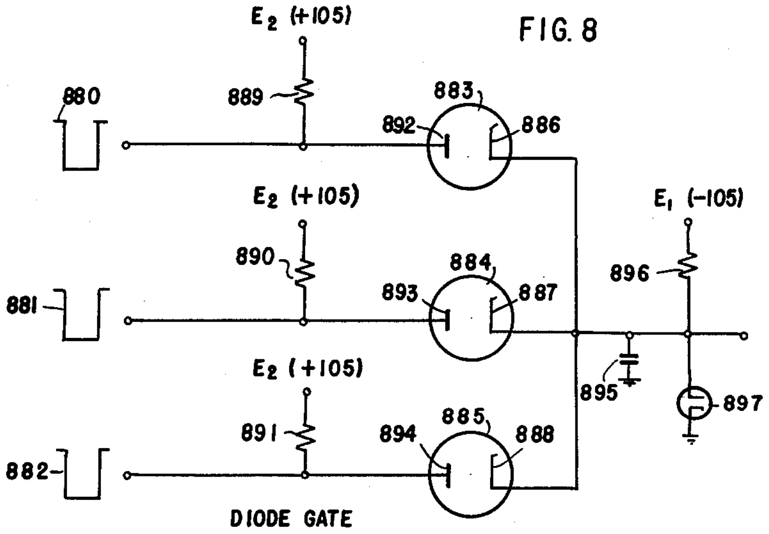
Figures 8 and 9 are schematic drawings of specific gating and buffer circuits which were illustrated in block form in the embodiment of Figure 1.

The operation of the gating or "And" circuits may be more readily understood with reference to Figure 8 in which three separate input pulses 880, 881 and 882 are applied to the input of diodes 883, 884 and 885 respectively. Each of the diodes comprises a semi-conductive material, such as germanium, or its equivalent, and a pair of electrodes and it is so arranged that the resistance afforded by the semi-conductive material is very low in one direction of transmission and extremely high in the other. The use of semi-conductive diodes is preferred to that of the usual vacuum tube diode since these diodes occupy much less space and the power requirements are much lower, resulting in lower cost. In addition, the diodes have negligible variation in amplitude with aging and afford an exact reproduction of the input signal as it passes through the diode.

Figure 8A:
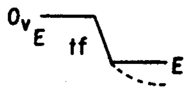
Figures 8A and 9A are graphical representations of wave forms which are illustrative of the operation of the circuits of Figures 8 and 9.

The anodes 892, 893 and 894 of the diodes 883–885 respectively, are separately biased to a potential $E_0$ (0 volts) by the series circuits formed by resistors 889, 890 and 891 which are respectively connected thereto and to a source of unidirectional positive potential $E_2$ which in this case may be positive 105 volts, through the respective diodes and through resistor 896 which is connected to a source of negative unidirectional potential $E_1$ (—105 volts). Anodes 892–894 are also connected to the output circuits of negative control-pulse generators (not shown). The cathodes 886–888 of diodes 883–885, respectively, are connected together and to ground through a capacitance 895 which may be the stray wiring capacity of the output circuit. Capacitance 895 is charged from a source $E_1$ of negative unidirectional potential which in this case may be —105 volts, through a resistor 896. Until pulses 880–882 are applied to gate, the charge on capacitor 895 is maintained at potential $E_0$ (0 volts) by a diode 897 which is connected to ground. When negative pulses 880–882 of equal potential E are applied to the inputs of diodes 883–885, these diodes are rendered non-conductive and capacitance 895 charges through resistor 896 to lower the potential of cathodes 886–888 of diodes 883–885 to a potential E equal to that of the applied pulses. At this point each of the diodes 883–885 conducts and tends to discharge stray capacity 895. As a result capacitance 895 never reaches a potential of greater negative value than that of the applied pulses. When the input pulses are no longer applied, and the potential of the anodes 892–894 of diodes 883–885 rises toward a voltage $E_0$, stray capacitance 895 is charged therethrough and returns to potential $E_0$. The greatest negative potential to which capacitance 895 may be charged is always equal to that of the pulse having the least negative value applied to the inputs of diodes 883–885. As a result an output signal is produced by the gating circuit only if negative pulses or levels are coincidentally applied to the inputs of each of the conductive diodes. Since the output signal from the gating circuit illustrated in Figure 8A depends upon the charging of a stray capacity 895, the value of the capacity and charging current determines the rise time of the output pulse. The resulting pulse is illustrated in Figure 8A and the fall time of the output pulse is as follows:

$$\text{Fall time } t_f = R_{896} \times C_{895} \times ln\left(\frac{E_1 - E_0}{E_1 - E}\right)$$

If any input signal is removed, the output voltage rapidly falls to $E_0$ since the shunt capacity discharges through the low impedance of the clamping diode and the gate input circuit. Specifically, as in the case of gate 31, unless the applications of the control pulse from multivibrator 34 and a master clock pulse from pulse driver unit 29 are coincidental, there will be no output from gate 31.

Figure 9:
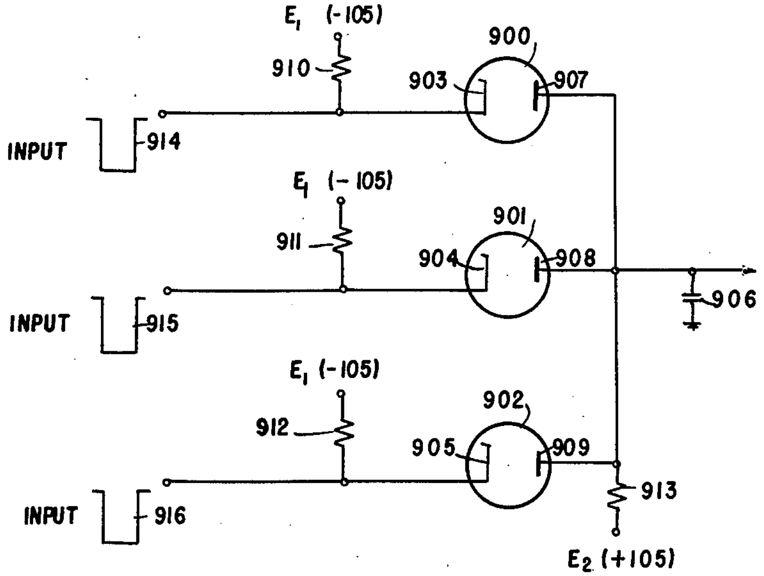
Figure 9A:
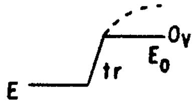

The diode mixer or buffer circuit illustrated in Figure 9 comprises three diodes 900, 901 and 902 connected in parallel and having their anodes 907, 908 and 909 connected together and feeding a capacitance 906, coupled to ground, from which an output signal is taken. A resistor 913 is connected to a source of positive unidirectional potential $E_2$ (+105 volts) and to the common anode junction. Capacitance 906 may be the stray wiring capicity of the output circuit. Input signals comprising negative pulses 914–916 are applied to the cathodes 903, 904 and 905 of diodes 900–902, respectively, each of which is biased for conduction by being connected to a source of unidirectional negative potential $E_1$ through resistors 910, 911 and 912, respectively. With no signal applied each of the diodes is conducting and its input terminal is at a potential $E_0$ established by the voltage divider comprising resistor 913 and the resistance in its cathode circuit. If a signal E having an amplitude less than $E_0$ is applied to any input, the output voltage will fall to the value of this signal since the corresponding input diode conducts more current, charging capacitance 906. The remaining input diodes are then cut off, since charging of capacity 906 lowers their respective anodes below the potential of their cathodes. At the end of the input signal E when the input signal level again rises to $E_0$, the then conducting diode ceases conducting and the shunt capacity 906 charges through resistor 913 towards voltage $E_2$. When the output rises to $E_0$, the input diodes again conduct, clamping the output voltage to $E_0$. The rise time of the output signal from voltage E to voltage $E_0$ illustrated in Figure 9A is given by the equation:

$$t_r = R_{913} \times C_{906} \times ln\left(\frac{E_2 - E}{E_2 - E_0}\right)$$

One successful commercial embodiment of the digital delay generator of the present invention, constructed according to the teachings of the above disclosure, comprised five multivibrator stages in the counting chain. While this arrangement was limited to producing a pulse delayed 31 microseconds, it was readily realized that additional counting stages as herein disclosed could be effectively employed without impairing the synchronization of the delayed pulse with respect to the reference to achieve a longer delay time.

In summary, the novel digital delay generator of the present invention may be used to accurately determine the delay time between a reference pulse and a second pulse delayed with respect thereto by enabling the use of a cathode ray tube having an expanded or fast sweep. Additionally, the novel delay generator may be used to generate a start pulse and one or more pulses delayed with respect to the reference pulse by the simple expedient of adding additional switching matrices to the delay generator. Furthermore, the delay time of any of these pulses may be simply adjusted to any amount depending upon the repetition rate of the master clock pulses and the number of counting units in the binary counting chain. In addition, by utilizing a low frequency external pulse source to determine the repetition rate of the master clock pulses, the delay time which the generator is capable of measuring may be extended almost indefinitely.

The delay generator is capable of measuring accurately the time interval between two randomly applied pulses or generating one or more pulses delayed by discrete time intervals with respect to a randomly applied pulse.

Since the master clock pulses from a crystal controlled oscillator are used as reference pulses, and as marker and reset pulses, the accuracy of the time interval measurements possible with the delay generator of the present invention is unaffected even with the expansion of the counting chain by adding additional multivibrator stages.

While we have described a preferred embodiment of our invention, it will be apparent that various modifications, changes and re-arrangements may be made without departing from the scope of the present invention, as defined by the appended claims.

I claim:

1. In a timing system for providing a pulse delayed by a predetermined interval with respect to a reference pulse; a source of timing pulses of a predetermined repetition rate, means coupled to said source for selecting one of said timing pulses as a reference pulse, an output circuit, and means including counting means operative to count a number of said source timing pulses which occurs in a period consistent with the elapse of said predetermined interval, and means controlled thereby to extend one of said source pulses to said output circuit as the delayed pulse.

2. In a timing system, a source of timing pulses having a predetermined cyclic period, means for selecting one of said timing pulses as a reference pulse, an output circuit, means including counting means operative in response to the counting thereby of a number of said source pulses which occur in a period consistent with the elapse of the predetermined interval to provide the subsequent one of said timing pulses to said output circuit as a delayed pulse, and means for effecting periodic repetition of the delay pulse in steps of one period of the master source.

3. In a timing system, a source of timing pulses having a predetermined cyclic period, means for selecting one of said timing pulses as a reference pulse, an output circuit, means including counting means operative in response to the counting thereby of a number of said source pulses which occur in a period consistent with the elapse of the predetermined interval to provide the subsequent one of said timing pulses to said output circuit as a delayed pulse, and means for producing periodic repetition of the reference pulse in steps of one period of the master source.

4. In a timing system for providing a pulse delayed by a predetermined interval with respect to a reference pulse; a source of timing pulses of a predetermined repetition rate, means coupled to said source for selecting one of said timing pulses as a reference pulse, selection means for preselecting the value of the predetermined delay interval desired, an output circuit, and means including counting means operative with selection of a reference pulse to count the number of said source timing pulses which occurs thereafter and controlled thereby with the occurrence of a number of pulses consistent with the delay period indicated on said selection means to extend one of said timing pulses to said output circuit.

5. In a timing system for providing a pulse delayed by a predetermined interval with respect to a reference pulse; a source of timing pulses of a predetermined repetition rate, means including a starting circuit coupled to said source for selecting one of said timing pulses as a reference pulse, an output circuit having access to an associated indicating means, means for connecting said output circuit to said indicating means, gate means for supplying said selected reference pulse to said indicating means connecting means, means controlled by said starting means for opening said gate, means operative in response to the application of said reference pulse to said output circuit connecting means to close said gate, means including counting means operative thereafter to selectively count the one of said timing pulses which occurs as the predetermined period elapses and means for supplying said selected delay pulse to said indicating means connecting means.

6. An arrangement as set forth in claim 5 in which said starting circuit includes a bistable multivibrator, means for connecting one section of said multivibrator to control opening of said gate for said reference pulse responsive to receipt of a starting signal, and means for connecting the second section of said multivibrator to effect closing of said gate responsive to application of said gated reference pulse to said selector means.

7. In a timing system for providing a pulse delayed by a determined interval with respect to a reference pulse; a source of timing pulses of a predetermined repetition rate, a starting circuit for said system including a one-shot generator, and gate control means controlled thereby to select one of said timing pulses as a reference pulse, an output circuit having access to an associated indicating means, means for connecting said output circuit to said indicating means, gate means operatively controlled to supply said pulse to said indicating means connecting means, means operative in response to the application of said reference pulse to said indicating means connecting means to close said gate, and means including counting means operative thereafter to selectively count the one of said timing pulses which occurs as a predetermined period elapses, and means for supplying said selected delay pulse to said indicating means connecting means.

8. An arrangement as set forth in claim 7 which includes a first starting circuit for said one-shot generator which is integral with the system and a second starting circuit controlled by an external source.

9. In a timing system for providing a pulse delayed by a predetermined interval with respect to a reference pulse, a source of timing pulses of a predetermined repetition rate, means including a starting circuit coupled to said source for selecting one of said timing pulses as a reference pulse, indicating means including counting means operative after selection of the reference pulse to count a predetermined number of pulses consistent with the elapse of the desired predetermined interval and to select the one of said timing pulses which occurs as the predetermined time period elapses, means for supplying said reference and said selected pulses to said indicating means, and means for effecting repeated cycling of the equipment in the presentation of sets of reference and delayed pulses.

10. In a timing system for providing a pulse delayed by a predetermined interval with respect to a reference pulse; a source of timing pulses of a predetermined repetition rate, means including a starting circuit coupled to said source for selecting one of said timing pulses as a reference pulse, a counting chain, a gate circuit for supplying timing pulses from said source to said counting chain to operate same, means controlled by the selected reference pulse for opening said gate, an output circuit, and means controlled by said counting chain to extend to said output circuit the one of said timing pulses which occurs immediately following measurement of said predetermined interval.

11. In a timing system for providing a pulse delayed by a predetermined interval with respect to a reference pulse; a source of timing pulses of a predetermined repetition rate, reference pulse selecting means coupled to said source for selecting one of said timing pulses as a reference pulse, an output circuit having access to an indicating means, means for connecting said output circuit to said indicating means, a first gate means for supplying said reference pulse to said indicating means connecting means; means including a counting chain for providing the said delay in time relative to said reference pulse, a second gate means for supplying energizing pulses to said counting chain; and means simultaneously operative responsive to extension of said reference pulse to said indicating means connecting means to open said second gate to said source pulses and to close said first gate to said pulses.

12. In a timing system, a source of timing pulses of a predetermined repetition rate, means coupled to said source for selecting one of said timing pulses as a reference pulse, an output circuit, switching matrix means for selecting the value of the desired predetermined interval of delay prior to provision of the delay pulse comprising a mechanical encoder for effecting binary to decimal conversion, and means including a binary counting chain operative to count the number of said source pulses which occur in a period consistent with the duration of the selected interval, and means controlled by said binary counting chain and said switching matrix to extend the one of said timing pulses which occurs after said measurement to said output circuit.

13. An arrangement as set forth in claim 12 which includes a gate member connected in said output circuit, means for connecting the timing pulses of said source to said gate, and means for effecting opening of said gate to said timing signal only responsive to receipt of a signal from said counting chain as extended over the switching matrix.

14. In a timing system, a source of timing pulses of a predetermined repetition rate, means coupled to said source for selecting one of said timing pulses as a reference pulse, a counting chain, and a plurality of selector means, each of which comprises a switching matrix which is operative to each of a number of different positions to select pulses at correspondingly different delay intervals relative to said reference pulse including means operative to control said counting chain to count a number of said source timing pulses consistent with the position of the switching matrix, and means controlled by said counting chain responsive to the determination of such count to extend a timing pulse from said source which is delayed at the desired time interval relative to said reference pulse.

15. In a timing system for providing a pulse delayed by a predetermined interval with respect to a reference pulse; timing pulse producing means having means for supplying pulses at a number of different repetition rates, means for selecting one of the timing pulses from one of the timing pulse producing means for use as a reference pulse, an output circuit, means operative to count a number of said timing pulses which occur during the elapse of the desired predetermined interval, means controlled by said counting means to extend the timing pulse which occurs subsequent to said interval to said output circuit, and means for selectively sampling the output from said timing pulse producing means for use as calibrator pulses, the reference pulse and the delay pulse being thereby in synchronization with selected ones of said calibrator pulses.

16. In a timing system for providing a pulse delayed by a predetermined interval with respect to the reference pulse; a source of timing pulses of a predetermined repetition rate, means including a starting circuit coupled to said source effective to select one of said timing pulses as a reference pulse, an output circuit, means including a counting chain operative in its count to extend to the output circuit as the delayed pulse the one of said pulses which occurs with the elapse of said predetermined interval and means for simultaneously extending said delayed pulse to said counting chain to reset the chain for further use, and to said starting circuit to effect initiation of a new cycle of the system.

17. An arrangement as set forth in claim 16 in which said counting chain comprises a plurality of multivibrator stages each having a first and a second section arranged for bistable operation connected to effect a binary count, and means operative responsive to provision of the delayed pulse to said chain to effect operation of the second section of each of said multivibrators to thereby effect resetting of each first section of the multivibrators and preparation of the chain for further use.

18. In a timing system for providing a pulse delayed by a predetermined interval with respect to a reference pulse; a source of timing pulses of a predetermined repetition rate, means including a starting circuit coupled to said source for selecting one of said timing pulses as a reference pulse, means including a counting chain operative in its count to select the one of said timing pulses from said source which occurs immediately preceding the elapse of said predetermined interval, a gate circuit for controlling application of the timing pulse from said source to said counting chain to operate said means, chain controlled by the selected reference pulse to open said gate, means controlled by the selected delay pulse to close said gate, means controlled by the selected delay pulse to reset said counting chain, and means controlled by the selected delay pulse to initiate a new cycle of the system.

19. In a timing system for providing a pulse delayed by a predetermined interval with respect to a reference pulse, a source of timing pulses having a predetermined repetition rate, an output circuit, a coincident gate for supplying at least one source pulse to said output circuit, means connecting said gate to sample said source pulses as generated, starting means including means operative with receipt of an incoming signal to supply a delay signal for aiding opening of said gate only after the elapse of a given delay period, and means operative responsive to said incoming signal to supply a blocking signal to said gate to prevent opening thereof for at least said given delay period, and means connected to said coincident gate including counting means operative to count a number of said source timing pulses which occur in a period subsequent to opening of said gate consistent with the desired time delay interval, and means controlled thereby to couple the subsequent one of the source pulses to said output circuit.

20. An arrangement as set forth in claim 19 in which said means supplying said blocking signal and said means supplying said delay signal are operative to block a source pulse and the pulse subsequent thereto, responsive to arrival of said pulse at the gate at a time which is subsequent to receipt of said incoming signal and prior to provision of said blocking signal.

21. In a timing system for providing a pulse delayed by a predetermined interval with respect to a reference pulse; a source of timing pulses of a predetermined repetition rate comprising a one megacycle oscillator and a pair of ten-to-one frequency divider units connected in cascade with the output of said oscillator, means for rendering said oscillator and said two frequency dividers effective for use in various combinations to supply timing pulses to the system at various repetition rates, means coupled to said source for selecting one of said timing pulses of the effective rate as a reference pulse, an output circuit, switching matrix means operative to preselect an interval of delay prior to provision of the delay pulse from a range of values which extends from 0 to at least 31 microseconds, and means including counting means comprising a five-step binary counting unit operative to count the number of said source pulses which occur in a period which is consistent with the elapse of the predetermined interval selected by said matrix, and means controlled by the counting means to extend the one of said source timing pulses to said output circuit which occurs after said interval measurement.

References Cited in the file of this patent

UNITED STATES PATENTS

| | | |
|---|---|---|
| 2,414,107 | Kenyon | Jan. 14, 1947 |
| 2,422,698 | Miller | June 24, 1947 |
| 2,687,511 | Penniman | Aug. 24, 1954 |

---

UNITED STATES PATENT OFFICE

CERTIFICATE OF CORRECTION

Patent No. 2,904,752 September 15, 1959

William Perzley

It is hereby certified that error appears in the printed specification of the above numbered patent requiring correction and that the said Letters Patent should read as corrected below.

Column 20, line 74, for "means, chain" read -- chain, means --.

Signed and sealed this 2nd day of August 1960.

(SEAL)
Attest:

KARL H. AXLINE
Attesting Officer

ROBERT C. WATSON
Commissioner of Patents

UNITED STATES PATENT OFFICE

CERTIFICATE OF CORRECTION

Patent No. 2,904,752 September 15, 1959

William Perzley

It is hereby certified that error appears in the printed specification of the above numbered patent requiring correction and that the said Letters Patent should read as corrected below.

Column 20, line 74, for "means, chain" read -- chain, means --.

Signed and sealed this 2nd day of August 1960.

(SEAL)
Attest:
KARL H. AXLINE
Attesting Officer

ROBERT C. WATSON
Commissioner of Patents